United States Patent
Kunt et al.

(10) Patent No.: US 12,204,470 B2
(45) Date of Patent: Jan. 21, 2025

(54) METHOD AND APPARATUS TO PERFORM DYNAMICALLY CONTROLLED INTERRUPT COALESCING FOR A SOLID STATE DRIVE

(71) Applicant: Intel Corporation, Santa Clara, CA (US)

(72) Inventors: Maksymilian Kunt, Gdansk (PL); Piotr Wysocki, Gdansk (PL); Mariusz Barczak, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 707 days.

(21) Appl. No.: 17/331,101

(22) Filed: May 26, 2021

(65) Prior Publication Data

US 2021/0279186 A1    Sep. 9, 2021

(51) Int. Cl.
*G06F 13/24* (2006.01)
*G06F 13/16* (2006.01)

(52) U.S. Cl.
CPC ...... *G06F 13/1642* (2013.01); *G06F 13/1668* (2013.01)

(58) Field of Classification Search
CPC .. G06F 13/1642; G06F 13/1668; G06F 3/061; G06F 3/0653; G06F 3/0658; G06F 3/0679; G06F 13/24
See application file for complete search history.

(56) References Cited

U.S. PATENT DOCUMENTS

| | | | |
|---|---|---|---|
| 8,886,981 B1 * | 11/2014 | Baumann | G06F 1/3203 713/323 |
| 11,068,422 B1 * | 7/2021 | Tai | G06F 9/4812 |
| 11,169,938 B2 * | 11/2021 | Gissin | G06F 3/0688 |
| 2015/0301572 A1 * | 10/2015 | Zhou | G06F 1/3203 713/320 |
| 2020/0296155 A1 * | 9/2020 | McGrath | G06F 9/5027 |
| 2021/0019270 A1 * | 1/2021 | Li | G06F 13/1668 |
| 2022/0124009 A1 * | 4/2022 | Metsch | H04L 41/5009 |
| 2022/0232072 A1 * | 7/2022 | Gerlitz | H04L 67/01 |
| 2022/0295336 A1 * | 9/2022 | Rao | H04W 4/44 |
| 2024/0241944 A1 * | 7/2024 | Smith | H04L 67/10 |

OTHER PUBLICATIONS

"NVM Express Base Specification", NVM Express Revision 1.4, Jun. 10, 2019, 403 pages.

* cited by examiner

*Primary Examiner* — Henry Tsai
*Assistant Examiner* — Kim T Huynh
(74) *Attorney, Agent, or Firm* — Compass IP Law PC

(57) ABSTRACT

Dynamically controlled interrupt coalescing is performed by enabling interrupt coalescing when the queue depth of the submission queue is high and disabling interrupt coalescing when the queue depth of the submission queue is low to maintain a required quality of service for a solid state drive. The minimum number of completions in the completion queue to trigger an interrupt is modified based on the queue depth of the submission queue. The minimum number of completions is increased when there is an increase in the queue depth of the submission queue and decreased when there is a decrease in the queue depth of the submission queue.

20 Claims, 10 Drawing Sheets

| Queue Depth | 1 | >10 | >30 | >60 |
|---|---|---|---|---|
| Enable Interrupt Coalescing | No | Yes | Yes | Yes |
| Completions per Interrupt | 1 | 3 | 10 | 30 |

FIG. 4

| Bits | |
|---|---|
| 31:0 | Reserved |
| 15:8 | Aggregation Time (TIME) |
| 7:0 | Aggregation Threshold (THR) |

FIG. 5A

| Bits | |
|---|---|
| 31:17 | Reserved |
| 16 | Coalescing Disable (CD) |
| 15:0 | Interrupt Vector (IV) |

FIG. 5B

METHOD AND APPARATUS TO PERFORM DYNAMICALLY CONTROLLED INTERRUPT COALESCING FOR A SOLID STATE DRIVE

FIELD

This disclosure relates to solid state drives and in particular to management of interrupt coalescing for a solid state drive.

BACKGROUND

Non-volatile memory refers to memory whose state is determinate even if power is interrupted to the device. A solid state drive is a storage device that stores data in non-volatile memory. The solid state drive includes a non-volatile memory and a controller to manage read/write requests received from a host communicatively coupled to the solid state drive directed to the non-volatile memory.

A host system can communicate with a solid state drive (SSD) over a high-speed serial computer expansion bus, for example, a Peripheral Component Interconnect Express (PCIe) bus using a Non-Volatile Memory Express (NVMe) standard protocol. The Non-Volatile Memory Express (NVMe) standard protocol defines a register level interface for host software to communicate with the solid state drive over the Peripheral Component Interconnect Express (PCIe) bus.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 4 is a table illustrating an example of dynamic configuration of interrupt coalescing and completions per interrupt based on queue depth of the submission queue;

FIGS. 5A and 5B are registers in the solid state drive to manage interrupt coalescing;

Figure 1:
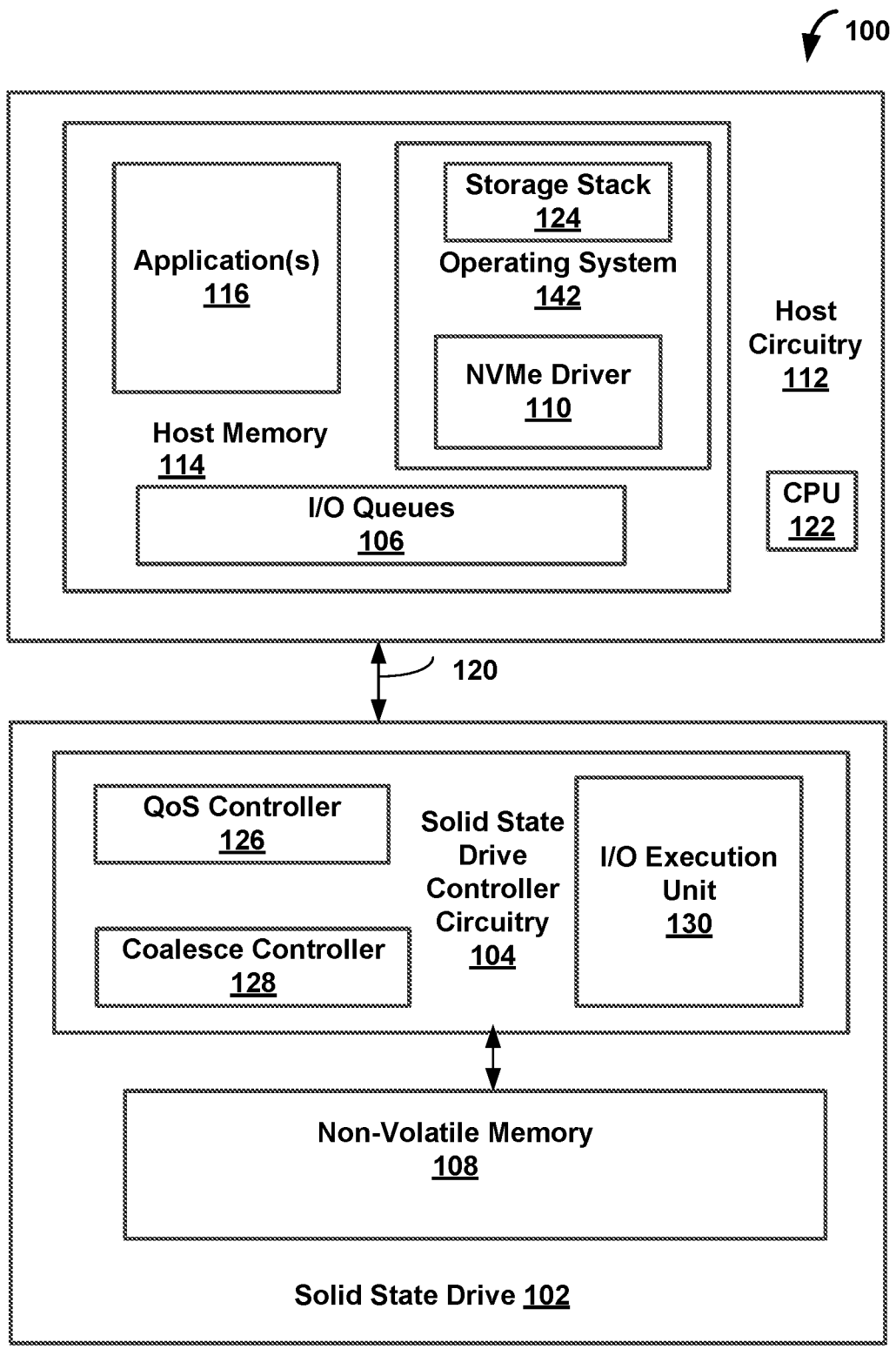
FIG. 1 is a block diagram of a computer system that includes host circuitry communicatively coupled to a solid state drive.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

The host system uses a paired submission and completion queue mechanism to communicate with the solid state drive using the NVMe standard protocol. Commands are placed by the host into a Submission Queue. Completions are placed into the associated Completion Queue by a controller in the solid state drive. Submission Queues and Completion Queues are allocated in memory in the host.

A Submission Queue (SQ) is a circular buffer with a fixed slot size that the host uses to submit commands for execution by the controller in the solid state drive. The controller in the solid state drive fetches SQ entries in order from the Submission Queue and may execute the commands in any order.

A Completion Queue (CQ) is a circular buffer with a fixed slot size used to post status for completed commands. A completed command is uniquely identified by a combination of the associated SQ identifier and command identifier that is assigned by the host. Multiple Submission Queues may be associated with a single Completion Queue.

The submission Queues and Completion Queues are used to carry out Input/Output (read/write) operations in the solid state drive. An interrupt architecture allows for reporting of completed commands by the solid state drive to the host.

An increase in the number Input/Output operations per second (IOPS) results in a corresponding increase in the number of completion interrupts to be processed by the host. For example, a solid state drive can obtain about 5 Mega (M) IOPS for a 512 Byte random read workload and about 1.5M IOPS for 4 kiloByte (kB) random read/write workloads.

An interrupt can be triggered (for example, level-triggered interrupt signal or edge-triggered interrupt signal) by the solid state drive each time status is posted to the completion queue for a completed command or interrupt aggregation (also referred to as interrupt coalescing) can be used to reduce the rate at which interrupts are triggered by the solid state drive.

The Quality of Service (QOS) of a solid state drive refers to the consistency and predictability of latency (response time) and IOPS (IOs Per Second) performance while servicing a read/write workload. Latency distribution of a solid state drive needs to hit a service level, which can be measured by the latency of an application workload for 99.9% of the time. IOPS performance of a solid state drive is the difference between the average and the lowest IOPS during application run time.

The number of commands (for example, read/write commands) in the submission queue is referred to as the Queue Depth (QD). When interrupt coalescing is disabled, there is one interrupt per command completion, QoS decreases as the Queue Depth increases due to time used to processes the interrupts. When interrupt coalescing is enabled, there is one interrupt for N command completions, QoS decreases as the Queue Depth decreases due to the delay in processing completed commands until N commands have completed.

To maintain the required Quality of Service for the solid state drive, dynamically controlled interrupt coalescing is performed by enabling interrupt coalescing when the queue depth of the submission queue is high and disabling interrupt coalescing when the queue depth of the submission queue is low. The minimum number of completions in the completion queue to trigger an interrupt is modified based on the queue depth of the submission queue. The minimum number of completions is increased when there is an increase in the queue depth of the submission queue and decreased when there is a decrease in the queue depth of the submission queue.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of a computer system 100 that includes host circuitry 112 communicatively coupled to a solid state drive 102. The solid state drive 102 can have an Enterprise and Data Center SSD Form Factor (EDSFF) and include 124 or more non-volatile memory dies. The host circuitry 112 includes a host memory 114 and a central processing unit (CPU) 122 that can also be referred to as a processor. One or more applications 116 (programs that perform a particular task or set of tasks) and an operating system 142 that includes a storage stack 124 and an NVMe driver 110 may be stored in host memory 114.

An operating system 142 is software that manages computer hardware and software including memory allocation and access to Input/Output (I/O) devices. Examples of operating systems include Microsoft® Windows®, Linux®, iOS®, VMware ESXi™ and Android®. In an embodiment for the Microsoft® Windows® operating system, the storage stack 124 may be a device stack that includes a port/miniport driver for the multi-stream solid state drive 102.

In an embodiment, the host memory 114 is a volatile memory. Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

The host circuitry 112 can communicate with the solid state drive 102 over a high-speed serial computer expansion bus 120, for example, a Peripheral Component Interconnect Express (PCIe) bus. The host circuitry 112 manages the communication over the high-speed serial computer expansion bus 120. In an embodiment, the host system communicates over the Peripheral Component Interconnect Express (PCIe) bus using a Non-Volatile Memory Express (NVMe) standard protocol. The Non-Volatile Memory Express (NVMe) standard protocol defines a register level interface for host software to communicate with the Solid State Drive (SSD) 102 over the Peripheral Component Interconnect Express (PCIe) bus. The NVM Express standards are available at www.nvmexpress.org. The PCIe standards are available at pcisig.com.

The solid state drive 102 includes solid state drive controller circuitry 104 and a non-volatile memory 108. A request to read data stored in the non-volatile memory 108 in the solid state drive 102 may be issued by one or more applications 116 (programs that perform a particular task or set of tasks) through the storage stack 124 in an operating system 142 over the high-speed serial expansion bus 120 to the solid state drive controller circuitry 104.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell (PLC) or some other NAND). A NVM device can also include a byte-addressable, write-in-place three dimensional Crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The solid state drive controller circuitry 104 in the solid state drive 102 queues and processes commands (for example, read and write commands received from the host circuitry 112 that are stored in Input/Output (I/O) queues 106 in the host circuitry 112 to perform operations in the non-volatile memory 108. Commands received by the solid state drive controller circuitry 104 from the host interface circuitry 202 can be referred to as Host Input Output (IO) commands.

The solid state drive controller circuitry 104 includes a Quality of Service (QOS) controller 126, a coalesce controller 128 and an Input/Output (I/O) execution unit 130.

Figure 2:
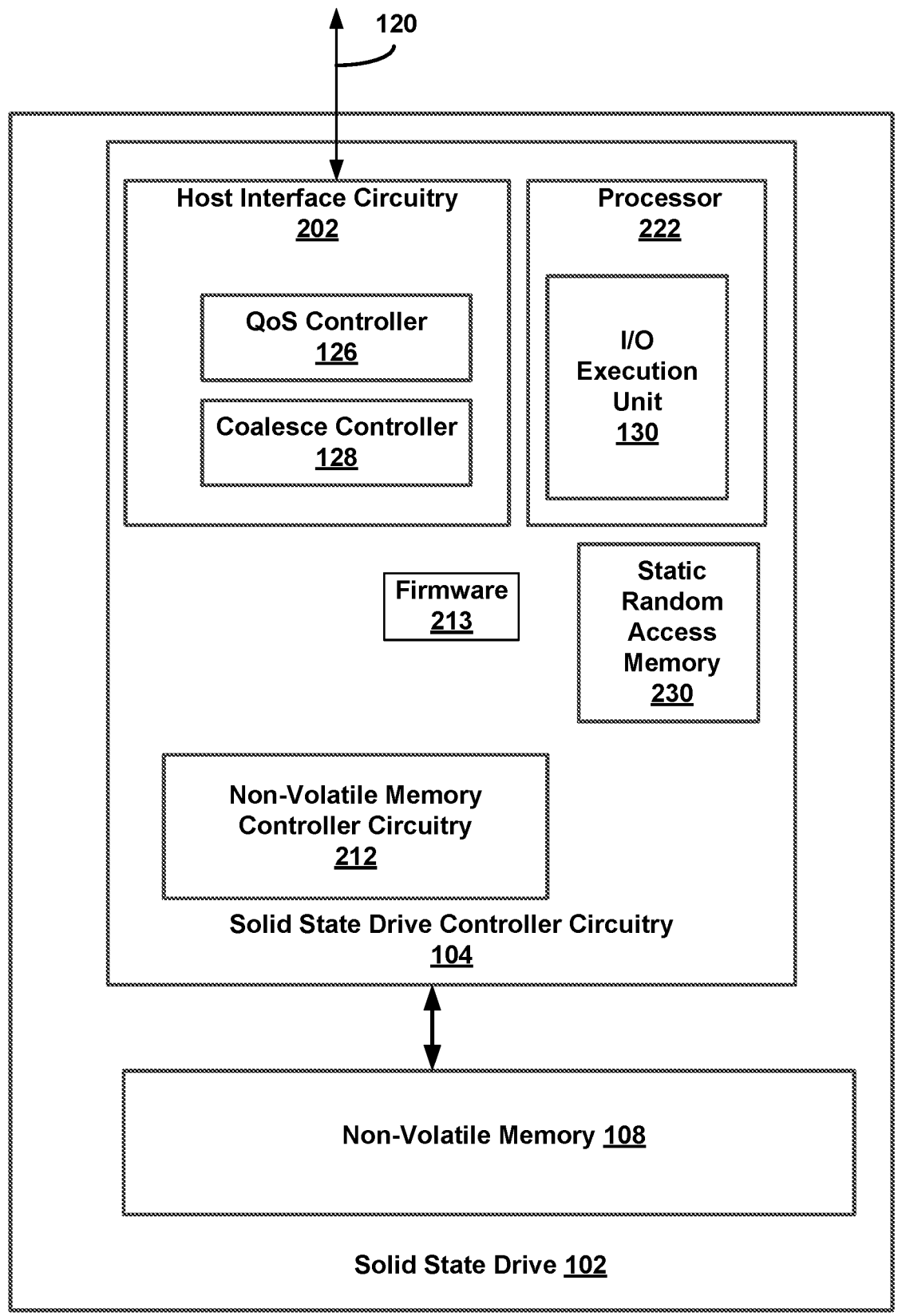
FIG. 2 is a block diagram of an embodiment of the solid state drive in FIG. 1.

FIG. 2 is a block diagram of an embodiment of the solid state drive 102 in FIG. 1. The solid state drive controller circuitry 104 in the solid state drive 102 includes host interface circuitry 202, non-volatile memory controller circuitry 212, processor 222, firmware 213 and Static Random Access Memory 230. Firmware 213 can be executed by processor 222. The solid state drive controller circuitry 104 can be included in a Field Programmable Gate Array (FPGA) or an Application Specific Integrated Circuit (ASIC).

Static Random Access Memory (SRAM) is a volatile memory. Volatile memory is memory whose state (and therefore the data stored in it) is indeterminate if power is interrupted to the device. SRAM is a type of volatile memory that uses latching circuitry to store each bit. SRAM is typically used as buffer memory because in contrast to Dynamic Random Access Memory (DRAM) the data stored in SRAM does not need to be periodically refreshed.

The non-volatile memory controller circuitry 212 in the solid state drive controller circuitry 104 queues and processes commands (for example, read and write commands) received from the host circuitry 112 for the non-volatile memory 108. Data associated with host I/O commands, for example, host read and host write commands received over the PCIe bus 120 from host circuitry 112 are stored in Static Random Access Memory 230. The host I/O commands are stored in I/O queues 106 in host circuitry 112.

Figure 3:
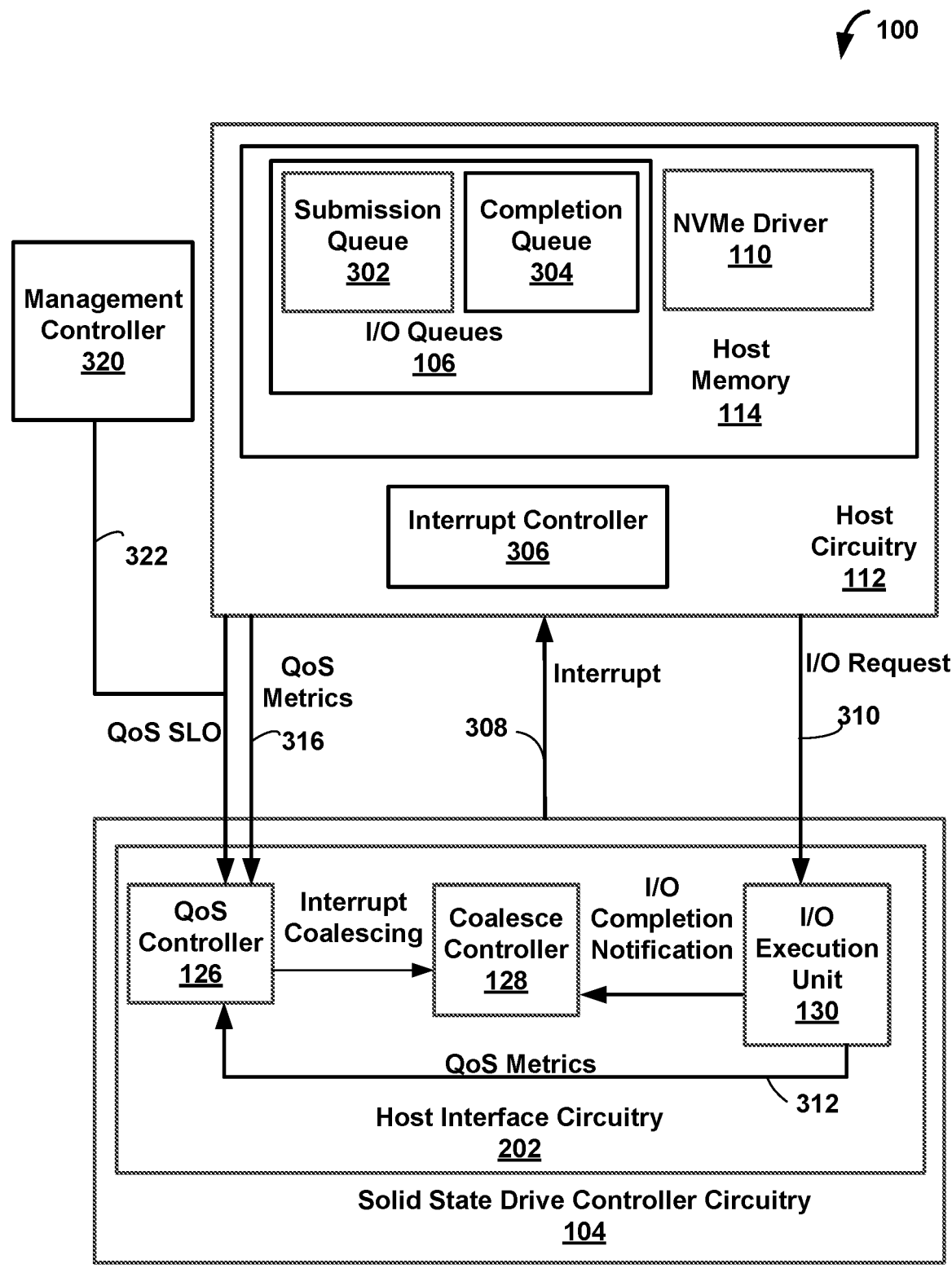
FIG. 3 is a block diagram illustrating components in the solid state drive to perform dynamically controlled interrupt coalescing.

FIG. 3 is a block diagram illustrating components in the solid state drive 102 to perform dynamically controlled interrupt coalescing. The host circuitry 112 uses a paired submission and completion queue mechanism to communicate with the solid state drive 102 using the NVMe standard protocol. I/O queues 106 include a submission queue 302 and a completion queue 304. Commands are placed by the host circuitry into the Submission Queue 302. Completions are placed into the associated Completion Queue 304 by the solid state drive circuitry 104 in the solid state drive 102.

The I/O Execution unit 130 processes a I/O request 310 that is received over bus 120 from the host circuitry 112 using the NVMe (NVM Express) over PCIe (Peripheral Component Interconnect Express) protocol. The I/O Execution unit 130 can be included in the processor 222. After the I/O request 310 has been processed, the I/O execution unit 130 sends an I/O completion notification to the coalesce controller 128. The coalesce controller 128 manages the generation of an interrupt 308 to the host circuitry 112 in response to receiving an I/O completion notification from the I/O execution unit 130.

The QoS controller 126 receives measured QOS Metrics 312 from the I/O execution unit 130, the measured QoS Metrics are monitored by the I/O execution unit 130. The QoS controller 126 can also receive measured QoS Metrics 306 that are monitored by the host circuitry 112 over bus 120. Examples of measured QoS Metrics includes the number of write, read and other operations performed during a time period. The QoS controller also receives QoS Service Level Objective (SLO) 322 which is the minimum QoS to be provided by the solid state drive 102. The QoS SLO 322 can be received from host circuitry 112 or from a management controller 320 in the computer system 100. The management controller 320 can be a Baseboard Management Controller (BMC) that monitors the physical state of the computer system 100.

In an embodiment, the QoS controller 126 is a feedback controller, for example, a PID (Proportional-Integral-Derivative) controller. A PID controller is a control loop mechanism using feedback. The PID controller continuously computes an error value as the difference between a desired setpoint and a measure process variable and applies a correction based on proportional, integral, and derivative terms. The QoS controller 126 uses the measured QoS metrics 312, 316 and QoS SLO 322 from host circuitry 112 and/or the base management controller 320 to maintain QoS SLO with minimal host load, that is, allowing an application to increase CPU utilization and reduction of utilization of the CPU to process interrupts.

In another embodiment, the QoS controller 126 can be in the NVMe driver 110 in the host circuitry 112. In an embodiment, the NVMe driver 110 is in kernel space in the operating system 142.

Based on the received QoS SLO and the measured QOS metrics, the QoS controller 126 configures interrupt coalescing in the coalesce controller 128. The QoS controller 126 can enable or disable interrupt coalescing in the coalesce controller 128 and set a number of completions to trigger an interrupt 308 over bus 120 to the host circuitry 112.

To maintain the required Quality of Service for the solid state drive 102, dynamically controlled interrupt coalescing is performed by enabling interrupt coalescing in the coalesce controller 128 by the QoS controller 126 when the queue depth of the submission queue 302 is high and disabling interrupt coalescing in the coalesce controller 128 by the QoS controller 126 when the queue depth of the submission queue 302 is low. The minimum number of completions in the completion queue 304 to trigger an interrupt 308 is modified based on the queue depth of the submission queue 302. The minimum number of completions is increased when there is an increase in the queue depth of the submission queue 302 and decreased when there is a decrease in the queue depth of the submission queue 302.

FIG. 4 is a table illustrating an example of dynamic configuration of interrupt coalescing and completions per interrupt based on queue depth of the submission queue 302. When the queue depth (QD) is one, interrupt coalescing is disabled and the number of completions per interrupt is not applicable because an interrupt is triggered for each completion. When the QD is greater than 10, interrupt coalescing is enabled and the number of completions per interrupt is 3. When the QD is greater than 30, interrupt coalescing is enabled and the number of completions per interrupt is 10. When the QD is greater than 60, interrupt coalescing is enabled and the number of completions per interrupt is 30.

FIGS. 5A and 5B are registers in the solid state drive 102 to manage interrupt coalescing. FIG. 5A is 32-bit interrupt coalescing register 500 that stores interrupt coalescing parameters including an aggregation time (TIME) and an aggregation threshold (THR). FIG. 5B is a 32-bit interrupt configuration register 502 that stores interrupt vector configuration parameters including coalescing disable (CD) bit and an interrupt vector (IV).

Turning to FIG. 5A, the aggregation time specifies the recommended maximum time in 100 microsecond increments that the coalesce controller 128 can delay generating an interrupt due to interrupt coalescing. The aggregation threshold specifies the recommended minimum number of completion queue entries to aggregate before generating an interrupt.

Turning to FIG. 5B, if the coalescing disable bit is "disabled" (for example, set to logical '1') in the interrupt configuration register 502, the interrupt coalescing parameters in the interrupt coalescing register 502 are not applied. If the coalescing disable bit is "enabled" (for example, set to logical '0') in the interrupt configuration register 502, the interrupt coalescing parameters in the interrupt coalescing register 502 are applied.

Figure 6A:
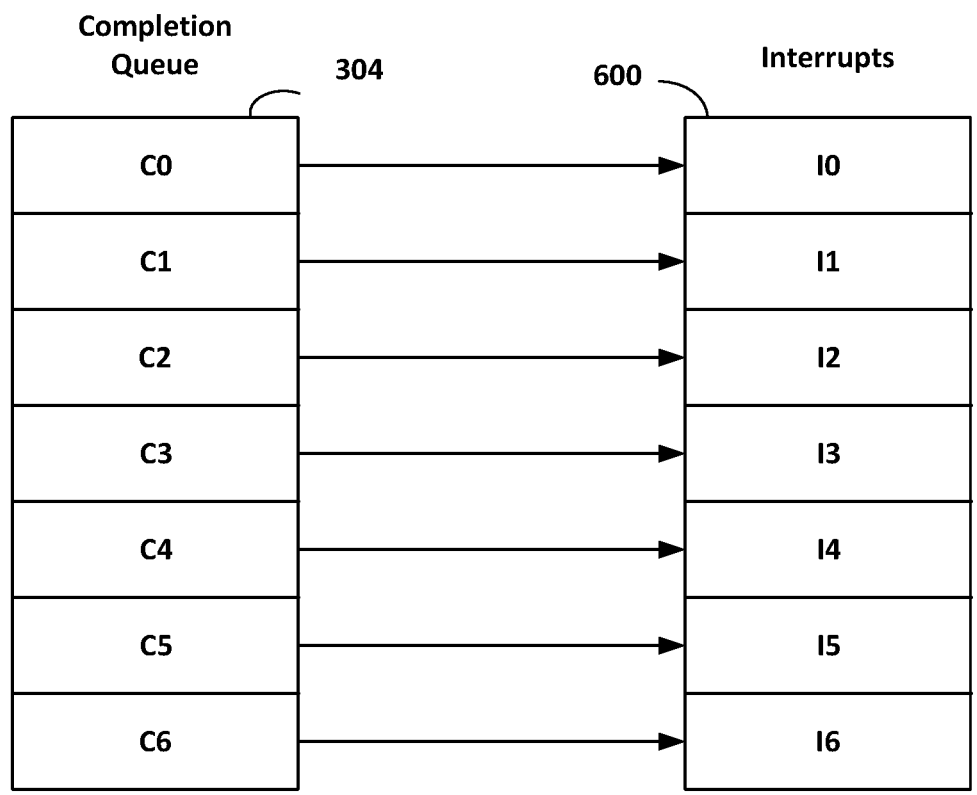
FIGS. 6A-6C are block diagrams illustrating mapping of entries on the I/O completion queue to interrupts.
Figure 6B:
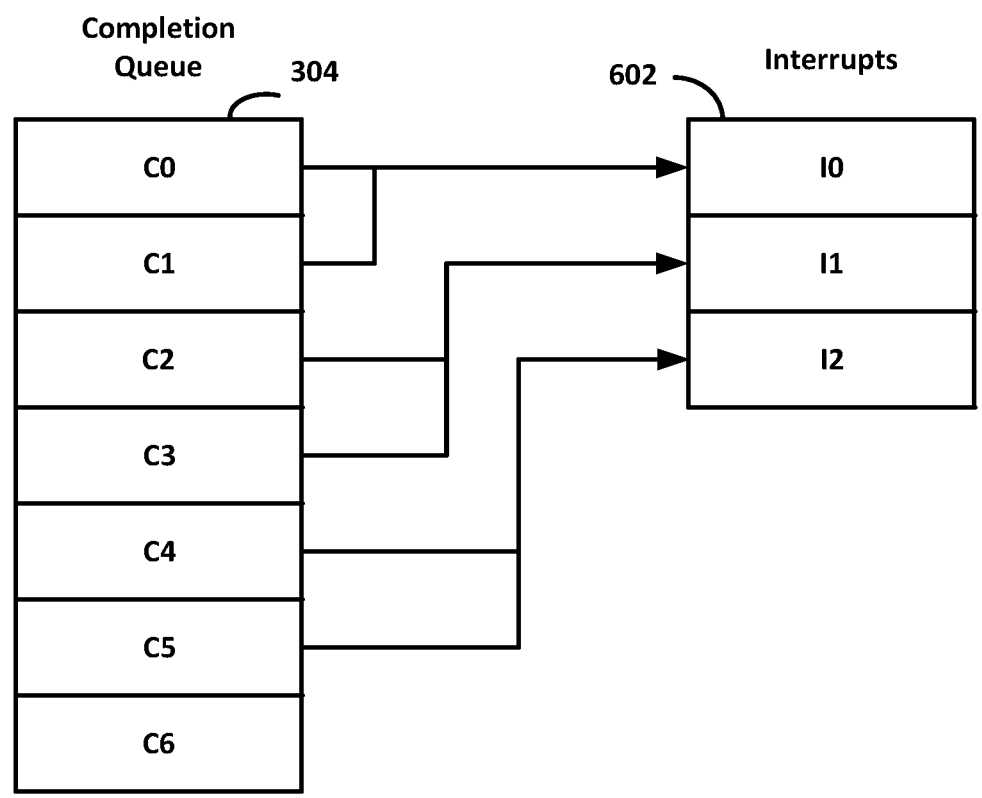
Figure 6C:
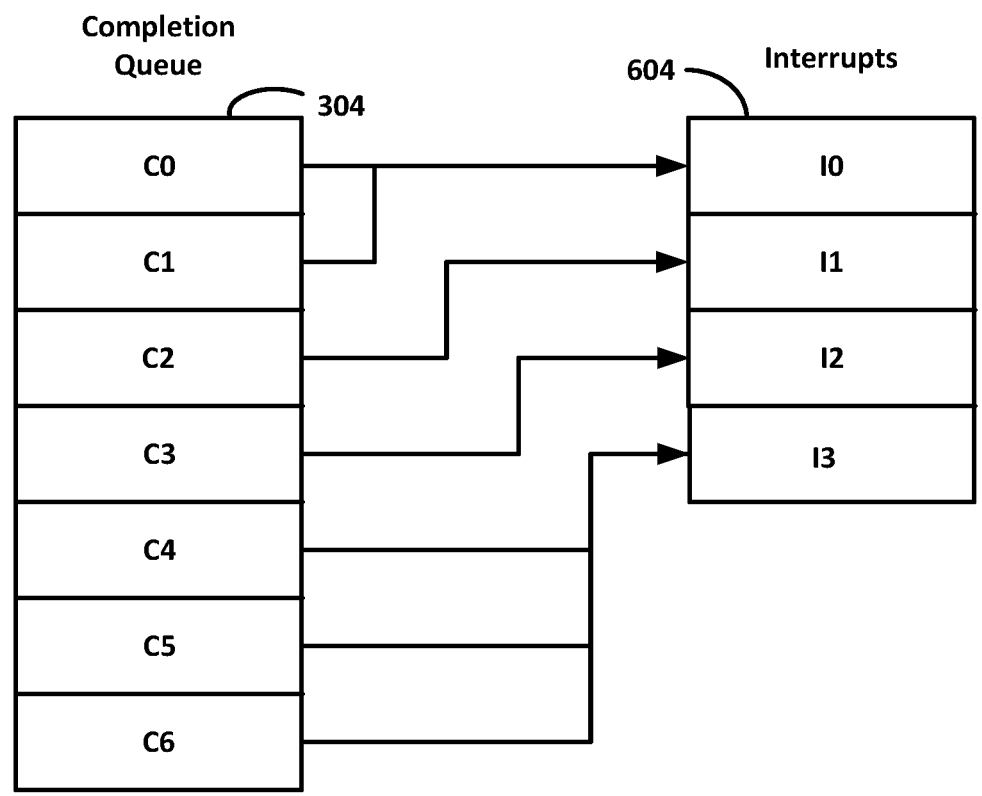

FIGS. 6A-6C are block diagrams illustrating mapping of entries on the I/O completion queue to interrupts.

FIG. 6A illustrates an example of interrupts 600 triggered for completions in the completion queue 304 while the coalescing disable bit is "disabled" in the interrupt configuration register 502. There is one interrupt per completion in the completion queue 304.

In the example shown in FIG. 6A, there are seven completions labeled C0-C6 in the completion queue 304 and seven interrupts (I0-I6) 600 are triggered for the completions C0-C6, one interrupt per completion.

FIG. 6B illustrates an example of interrupts 602 triggered for completions in the completion queue 304 while the coalescing disable bit is "enabled" in the interrupt configuration register 502 and the aggregation threshold in the interrupt coalescing register 500 is set to 2.

Three interrupts I0-I3 are triggered (generated) for six completions C0-C5, with interrupt I0 triggered for completions C0-C1, interrupt I2 triggered for completions C2-C3 and interrupt I3 triggered for completions C4-C5.

FIG. 6C illustrates an example of interrupts 604 triggered for dynamically controlled interrupt coalescing by enabling interrupt coalescing when the queue depth of the submission queue is high and disabling interrupt coalescing when the queue depth of the submission queue is low. The minimum number of completions in the completion queue to trigger an interrupt is modified based on the queue depth of the submission queue. The minimum number of completions is increased when there is an increase in the queue depth of the submission queue and decreased when there is a decrease in the queue depth of the submission queue.

Interrupt coalescing is enabled in the interrupt configuration register 502 and the aggregation threshold in the interrupt coalescing register 500 is set to 2 for completions C0-C1 and one interrupt I0 is triggered.

Interrupt coalescing is disabled in the interrupt configuration register 502 for completions C2-C3. Interrupt I1 is triggered for completion C2 and interrupt I2 is triggered for completion C3.

Interrupt coalescing is enabled in the interrupt configuration register 502 and the aggregation threshold in the interrupt coalescing register 500 is set to 3 for completions C4-C6 and one interrupt I3 is triggered.

Figure 7:
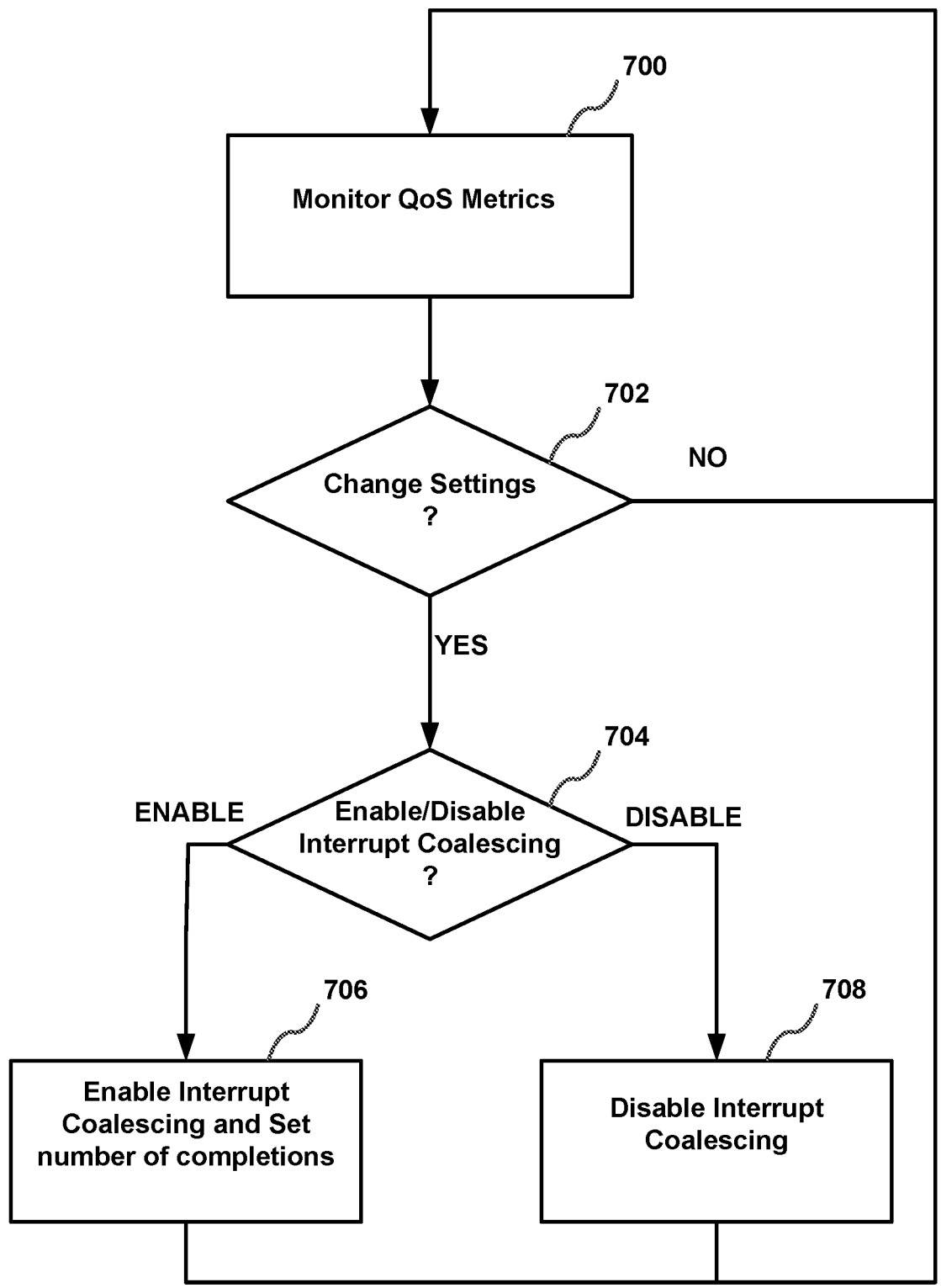
FIG. 7 is a flowgraph illustrating a method to perform dynamically controlled interrupt coalescing.

FIG. 7 is a flowgraph illustrating a method to perform dynamically controlled interrupt coalescing.

At block 700, the QoS controller 126 monitors measured QoS metrics 312 received from I/O Execution Unit 130 and measured QoS metrics 306 received from host circuitry 112.

At block 702, the QoS controller 126 determines based on the QoS metrics 312, 306 and QoS SLO if settings in the interrupt configuration register 502 should be changed. If settings are not to be changed, processing continues with block 700 to continue to monitor QoS metrics 312, 306. If setting are to be changed, processing continues with block 704.

At block 704, if interrupt coalescing is to be enabled, processing continues with block 706. If interrupt coalescing is to be disabled, processing continues with block 708.

At block 706, interrupt coalescing is enabled by setting the coalescing disable bit to "enabled" (for example, set to logical '0') in the interrupt configuration register 502, and the interrupt coalescing parameters can be modified in the interrupt coalescing register 502 based on the monitored QoS metrics. Processing continues with block 700 to monitor the QoS metrics.

At block 708, the coalescing disable bit is "disabled" (for example, set to logical '1') in the interrupt configuration register 502. The interrupt coalescing parameters in the interrupt coalescing register 502 are not applied. Processing continues with block 700 to monitor the QoS metrics.

Figure 8:
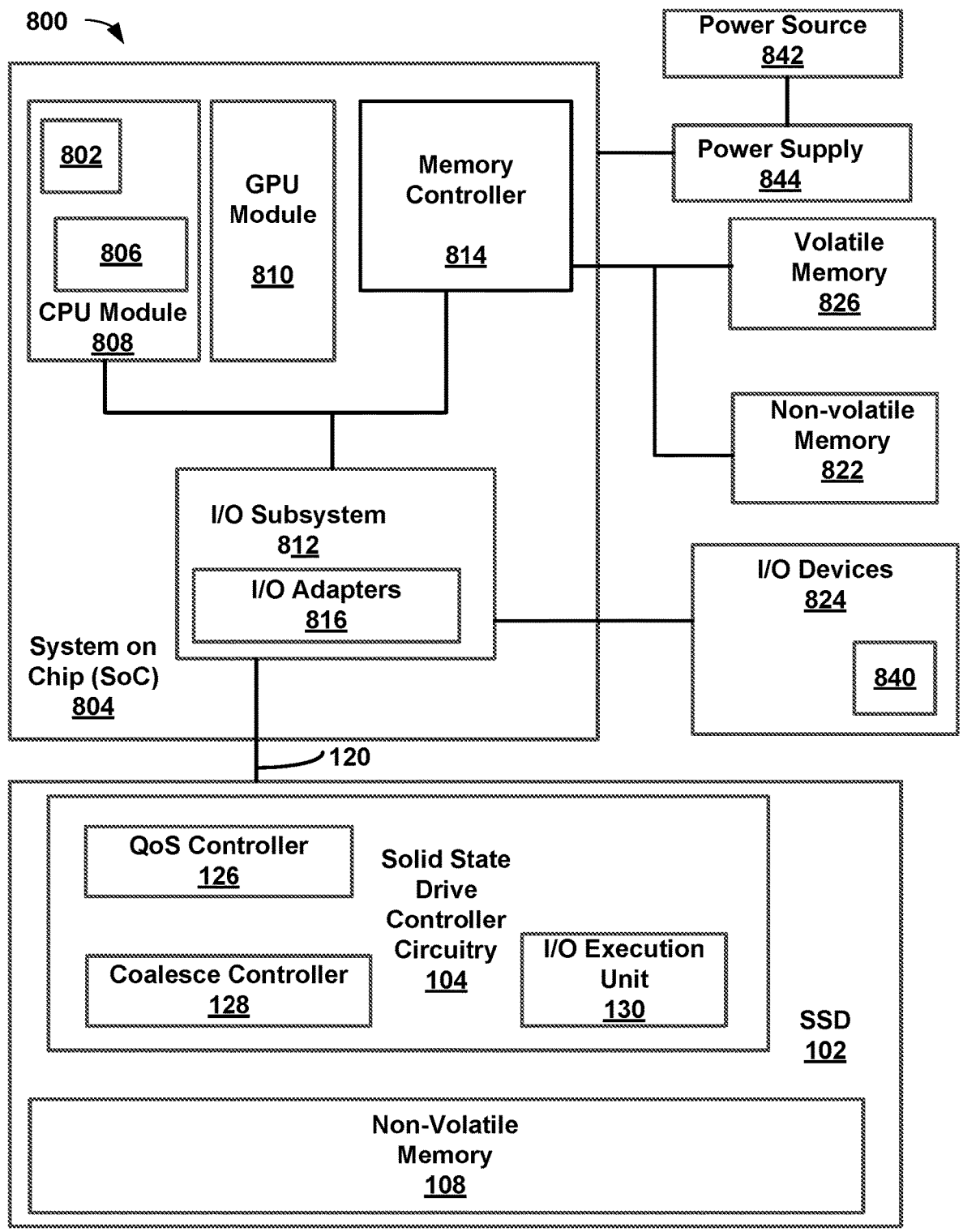
FIG. 8 is a block diagram of an embodiment of a computer system that includes the solid state drive to perform dynamically controlled interrupt coalescing.

FIG. 8 is a block diagram of an embodiment of a computer system 800 that includes the solid state drive 102 to perform dynamically controlled interrupt coalescing. Computer system 800 can correspond to a computing device including, but not limited to, a server, a workstation computer, a desktop computer, a laptop computer, and/or a tablet computer.

The computer system 800 includes a system on chip (SOC or SoC) 804 which combines processor, graphics, memory, and Input/Output (I/O) control logic into one SoC package. The SoC 804 includes at least one Central Processing Unit (CPU) module 808, a memory controller 814 that can be coupled to volatile memory 826 and/or non-volatile memory 822, and a Graphics Processor Unit (GPU) 810. In other embodiments, the memory controller 814 can be external to the SoC 804. The CPU module 808 includes at least one processor core 802 and a level 2 (L2) cache 806.

Although not shown, each of the processor core(s) 802 can internally include one or more instruction/data caches, execution units, prefetch buffers, instruction queues, branch address calculation units, instruction decoders, floating point units, retirement units, etc. The CPU module 808 can correspond to a single core or a multi-core general purpose processor, such as those provided by Intel® Corporation, according to one embodiment.

The Graphics Processor Unit (GPU) 810 can include one or more GPU cores and a GPU cache which can store graphics related data for the GPU core. The GPU core can internally include one or more execution units and one or more instruction and data caches. Additionally, the Graphics Processor Unit (GPU) 810 can contain other graphics logic units that are not shown in FIG. 8, such as one or more vertex processing units, rasterization units, media processing units, and codecs.

Within the I/O subsystem 812, one or more I/O adapter(s) 816 are present to translate a host communication protocol utilized within the processor core(s) 802 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 816 can communicate with external I/O devices 824 which can include, for example, user interface device(s) including a display and/or a touch-screen display 840, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapters 816 can include a Peripheral Component Interconnect Express (PCIe) adapter that is communicatively coupled using the NVMe (NVM Express) over PCIe (Peripheral Component Interconnect Express) protocol over bus 120 to the host interface circuitry 104 in the solid state drive 102.

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, JESD79-4, originally published in September 2012 by JEDEC), DDR5 (DDR version 5, JESD79-5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

Power source 842 provides power to the components of system 800. More specifically, power source 842 typically interfaces to one or multiple power supplies 844 in system 800 to provide power to the components of system 800. In one example, power supply 844 includes an AC to DC (alternating current to direct current) adapter to plug into a wall outlet. Such AC power can be renewable energy (e.g., solar power) power source 842. In one example, power source 842 includes a DC power source, such as an external AC to DC converter. In one example, power source 842 or power supply 844 includes wireless charging hardware to charge via proximity to a charging field. In one example, power source 842 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments. Specifics in the examples may be used anywhere in one or more embodiments.

Example 1 is a solid state drive including a non-volatile memory to store data and host interface circuitry to manage requests received from a host to access the non-volatile memory. The host interface circuitry including a coalesce controller to monitor completion of received requests and to trigger an interrupt to the host and a Quality of Service (QOS) controller to monitor quality of service metrics and to compare the monitored quality of services metrics with a QoS service level objective (SLO) to enable trigger of the interrupt to the host and to dynamically select a number of completions of received requests to trigger the interrupt.

Example 2 includes the solid state drive of Example 1 and an Input/Output (I/O) execution unit to process requests received from a submission queue in the host and to store completions of the received requests in a completion queue in the host.

Example 3 includes the solid state drive of Example 2, the number of completions of received requests to trigger the interrupt is dependent on a depth of the submission queue.

Example 4 includes the solid state drive of Example 3, a minimum number of completions of received requests to trigger the interrupt is increased when there is an increase in the depth of the submission queue and decreased when there is a decrease in the depth of the submission queue.

Example 5 includes the solid state drive of Example 4, the minimum number of completions of received requests to trigger the interrupt is one when the depth of the submission queue is low.

Example 6 includes the solid state drive of Example 2, the quality of service metrics are monitored by the I/O execution unit.

Example 7 includes the solid state drive of Example 1, wherein the quality of service metrics are monitored by the host.

Example 8 is a method comprising managing, by host interface circuitry, requests received from a host to access a non-volatile memory, the non-volatile memory to store data and the host interface circuitry including a coalesce controller and a Quality of Service (QOS) controller, monitoring, by the coalesce controller, completion of received requests to trigger an interrupt to the host and monitoring, by the Quality of Service (QoS) controller, quality of service metrics, comparing, by the Quality of Service (QOS) controller, the quality of services metrics with a QoS service level objective (SLO) to enable trigger of the interrupt to the host, and dynamically selecting, by the Quality of Service (QOS) controller, a number of completions of received requests to trigger the interrupt.

Example 9 includes the method of Example 8 further comprising processing, by an Input/Output (I/O) execution unit, requests received from a submission queue in the host and storing, by the Input/Output (I/O) execution unit, completions of the received requests in a completion queue in the host.

Example 10 includes method of Example 9, wherein the number of completions of received requests to trigger the interrupt is dependent on a depth of the submission queue.

Example 11 includes the method of Example 10, wherein a minimum number of completions of received requests to trigger the interrupt is increased when there is an increase in the depth of the submission queue and decreased when there is a decrease in the depth of the submission queue.

Example 12 includes the method of Example 11, wherein the minimum number of completions of received requests to trigger the interrupt is one when the depth of the submission queue is low.

Example 13 includes the method of Example 8, wherein the quality of service metrics are monitored by the I/O execution unit.

Example 14 includes the method of Example 8, wherein the quality of service metrics are monitored by the host.

Example 15 is a system comprising a processor and a solid state drive comprising a non-volatile memory to store data and host interface circuitry to manage requests received from a host to access the non-volatile memory. The host interface circuitry including a coalesce controller to monitor completion of received requests and to trigger an interrupt to the host and a Quality of Service (QOS) controller to monitor quality of service metrics and to compare the monitored quality of services metrics with a QoS service level objective (SLO) to enable trigger of the interrupt to the host and to dynamically select a number of completions of received requests to trigger the interrupt.

Example 16 includes the system of Example 15, further comprising an Input/Output (I/O) execution unit to process requests received from a submission queue in the host and to store completions of the received requests in a completion queue in the host.

Example 17 includes the system of Example 16, wherein the number of completions of received requests to trigger the interrupt is dependent on a depth of the submission queue.

Example 18 includes the system of Example 17, wherein a minimum number of completions of received requests to trigger the interrupt is increased when there is an increase in the depth of the submission queue and decreased when there is a decrease in the depth of the submission queue.

Example 19 includes the system of Example 18, wherein the minimum number of completions of received requests to trigger the interrupt is one when the depth of the submission queue is low.

Example 20 includes the system of Example 15, further comprising one or more of a display communicatively coupled to the processor or a battery coupled to the processor.

What is claimed is:

1. A solid state drive comprising:
   a non-volatile memory to store data; and
   host interface circuitry to manage requests received from a host to access the non-volatile memory, the host interface circuitry including:
      a coalesce controller to monitor completion of received requests and to trigger an interrupt to the host; and
      a Quality of Service (QOS) controller to monitor quality of service metrics and to compare the monitored quality of services metrics with a QoS service level objective (SLO) to enable trigger of the interrupt to the host and to dynamically select a number of completions of received requests to trigger the interrupt.

2. The solid state drive of claim 1, further comprising:
   an Input/Output (I/O) execution unit to process requests received from a submission queue in the host and to store completions of the received requests in a completion queue in the host.

3. The solid state drive of claim 2, wherein the number of completions of received requests to trigger the interrupt is dependent on a depth of the submission queue.

4. The solid state drive of claim 3, wherein a minimum number of completions of received requests to trigger the interrupt is increased when there is an increase in the depth of the submission queue and decreased when there is a decrease in the depth of the submission queue.

5. The solid state drive of claim 4, wherein the minimum number of completions of received requests to trigger the interrupt is one when the depth of the submission queue is low.

6. The solid state drive of claim 2, wherein the quality of service metrics are monitored by the I/O execution unit.

7. The solid state drive of claim 1, wherein the quality of service metrics are monitored by the host.

8. A method comprising:
   managing, by host interface circuitry, requests received from a host to access a non-volatile memory, the non-volatile memory to store data and the host interface circuitry including a coalesce controller and a Quality of Service (QOS) controller;
   monitoring, by the coalesce controller, completion of received requests to trigger an interrupt to the host; and
   monitoring, by the Quality of Service (QOS) controller, quality of service metrics;
   comparing, by the Quality of Service (QOS) controller, the quality of services metrics with a QoS service level objective (SLO) to enable trigger of the interrupt to the host; and
   dynamically selecting, by the Quality of Service (QOS) controller, a number of completions of received requests to trigger the interrupt.

9. The method of claim 8, further comprising:
   processing, by an Input/Output (I/O) execution unit, requests received from a submission queue in the host; and storing, by the Input/Output (I/O) execution unit, completions of the received requests in a completion queue in the host.

10. The method of claim 9, wherein the number of completions of received requests to trigger the interrupt is dependent on a depth of the submission queue.

11. The method of claim 10, wherein a minimum number of completions of received requests to trigger the interrupt is increased when there is an increase in the depth of the submission queue and decreased when there is a decrease in the depth of the submission queue.

12. The method of claim 11, wherein the minimum number of completions of received requests to trigger the interrupt is one when the depth of the submission queue is low.

13. The method of claim 9, wherein the quality of service metrics are monitored by the I/O execution unit.

14. The method of claim 8, wherein the quality of service metrics are monitored by the host.

15. A system comprising:
a processor; and
a solid state drive comprising:
 a non-volatile memory to store data; and
 host interface circuitry to manage requests received from a host to access the non-volatile memory, the host interface circuitry including:
 a coalesce controller to monitor completion of received requests and to trigger an interrupt to the host; and
 a Quality of Service (QOS) controller to monitor quality of service metrics and to compare the monitored quality of services metrics with a QoS service level objective (SLO) to enable trigger of the interrupt to the host and to dynamically select a number of completions of received requests to trigger the interrupt.

16. The system of claim 15, further comprising:
an Input/Output (I/O) execution unit to process requests received from a submission queue in the host and to store completions of the received requests in a completion queue in the host.

17. The system of claim 16, wherein the number of completions of received requests to trigger the interrupt is dependent on a depth of the submission queue.

18. The system of claim 17, wherein a minimum number of completions of received requests to trigger the interrupt is increased when there is an increase in the depth of the submission queue and decreased when there is a decrease in the depth of the submission queue.

19. The system of claim 18, wherein the minimum number of completions of received requests to trigger the interrupt is one when the depth of the submission queue is low.

20. The system of claim 15, further comprising one or more of:
a display communicatively coupled to the processor; or
a battery coupled to the processor.

* * * * *

UNITED STATES PATENT AND TRADEMARK OFFICE
CERTIFICATE OF CORRECTION

PATENT NO. : 12,204,470 B2
APPLICATION NO. : 17/331101
DATED : January 21, 2025
INVENTOR(S) : Maksymilian Kunt, Piotr Wysocki and Mariusz Barczak It is certified that error appears in the above-identified patent and that said Letters Patent is hereby corrected as shown below:

In the Claims

Column 12, Line 10 Claim 1: "a Quality of Service (QOS) controller to monitor quality of service metrics" should read a Quality of Service (QoS) controller to monitor quality of service metrics Column 12, Line 46 Claim 8: "the non-volatile memory to store data and the host interface circuitry including a coalesce controller and a Quality of Service (QOS) controller;
monitoring, by the coalesce controller, completion of received requests to trigger an interrupt to the host; and
　　monitoring, by the Quality of Service (QOS) controller, quality of service metrics;
　　　　comparing, by the Quality of Service (QOS) controller, the quality of services metrics with a QoS service level objective (SLO) to enable trigger of the interrupt to the host; and dynamically selecting, by the Quality of Service (QOS) controller, a number of completions of received requests to trigger the interrupt." should read the non-volatile memory to store data and the host interface circuitry including a coalesce controller and a Quality of Service (QoS) controller;
monitoring, by the coalesce controller, completion of received requests to trigger an interrupt to the host; and
　　monitoring, by the Quality of Service (QoS) controller, quality of service metrics;
　　　　comparing, by the Quality of Service (QoS) controller, the quality of services metrics with a QoS service level objective (SLO) to enable trigger of the interrupt to the host; and dynamically selecting, by the Quality of Service (QoS) controller, a number of completions of received requests to trigger the interrupt.

Column 14, Line 1 Claim 15: "a Quality of Service (QOS) controller to monitor quality of service metrics" should read a Quality of Service (QoS) controller to monitor quality of service metrics Signed and Sealed this
Twenty-ninth Day of April, 2025

Coke Morgan Stewart
*Acting Director of the United States Patent and Trademark Office*